United States Patent Office 3,379,659
Patented Apr. 23, 1968

3,379,659
ORGANOPOLYSILOXANE FOAM-FORMING
MATERIALS
Robert A. Murphy, Burnt Hills, N.Y., assignor to General
Electric Company, a corporation of New York
No Drawing. Filed Jan. 4, 1965, Ser. No. 423,289
14 Claims. (Cl. 260—2.5)

ABSTRACT OF THE DISCLOSURE

Room temperature vulcanizing organopolysiloxane foam forming compositions and a method for making organopolysiloxane foams are provided. The foam forming organopolysiloxane compositions utilize a silicon hydride and an aminoxy-substituted organosilicon material. Foaming is achieved by the liberation of hydrogen from the silicon hydride, when the foam forming composition is contacted with a hydroxylated material such as atmospheric moisture.

---

The present invention relates to a method and composition for making organopolysiloxane elastomeric foams resulting from the liberation of hydrogen. More particularly, the present invention relates to the production of room temperature vulcanizing organopolysiloxane compositions utilizing a mixture of organosilicon materials having amine radicals attached to silicon through Si ON linkages, and organosilicon materials having hydrogen attached to silicon.

Organopolysiloxane foam has been utilized in a variety of applications requiring a resilient material having low temperature flexibility, toughness, lightweight, and outstanding heat resistance. A valuable application for organopolysiloxane compositions convertible to organopolysiloxane foam at room temperature is as encapsulating material for electronic components. Additional applications for organopolysiloxane foam are as heat resistant shock absorbers, gaskets, etc.

A method that can be employed for making organopolysiloxane foam by the liberation of gaseous hydrogen is shown by Bruner Patent 3,070,555. Bruner employs a hydroxylated siloxane, and a siloxane having hydrogen attached to silicon in the presence of a tin soap catalyst. Although Bruner's method provides for satisfactory organopolysiloxane foam at room temperature, it has a serious disadvantage. Contact of the metal soap catalyst with the curable mixture causes immediate hydrogen evolution and can result in a relatively short cure time. As a result, it is often difficult to make a curable organopolysiloxane composition by the method of Bruner having a pot life which is sufficiently long enough to satisfy large scale production requirements. For example, it is sometimes economically desirable to operate with large batches of foam-forming organopolysiloxane composition; a pot life of several hours is desirable to allow for sufficient pour time. Another disadvantage of Bruner's organopolysiloxane foam forming composition is that it must be utilized as soon as it is made; it cannot be employed as a one package mixture which can be utilized after extended shelf periods.

The present invention is based on the discovery that nitrogen-containing silicon materials having —OY radicals attached to silicon in the form of a structural unit of the formula, (1) ≡SiOY where Y is a monovalent amine radical selected from —NR$_2$, and a heterocyclic amine attached to silicon by an Si ON linkage, provide for one package organopolysiloxane compositions useful for making organopolysiloxane foam, where R is a monovalent hydrocarbon radical and the remaining valences of the silicon atom of said structural unit can be satisfied by a member selected from —OY, oxygen, divalent hydrocarbon radicals, R' radicals, and mixtures thereof, where R' is selected from R radicals and halogenated R radicals. These nitrogen-containing silicon materials and methods for making them are more particularly shown in my copending application Ser. No. 423,354 filed concurrently herewith, and assigned to the same assignee as the present invention.

There is provided by the present invention a method which comprises mixing together (A) a nitrogen-containing silicon material having the structural unit of Formula 1, (B) a linear organosilicon polymer having a viscosity of at least 1,000 centipoises at 25° C., consisting essentially of chemically combined units of the formula, (2)
$$\begin{array}{c} R'' \\ | \\ SiO \\ | \\ R'' \end{array}$$

and terminal units of the formula, (3)
$$\begin{array}{c} R'' \\ | \\ SiX \\ | \\ R'' \end{array}$$

where X is a member selected from hydroxy, and a mixture of hydrogen and hydroxy, where the hydrogen can be present at up to 50 mole percent based on moles of hydrogen and hydroxy, (C) a silicon hydride, preferably having at least one chemically combined siloxy unit with hydrogen attached to silicon and a ratio of at least one organo radical per silicon atom, and (D) a hydroxylated material, where (A) is utilized in the resulting mixture in an amount sufficient to provide for a concentration of at least 25 mole percent of —OY radicals, based on the total of —OY radicals, and X radicals, (C) is utilized in a proportion of from 1% to 75% by weight of (B), (D) is utilized in a proportion of up to 50% by weight of (B), (B) has a ratio of from 1.95 to about two R'' radicals per silicon atom, where said R'' radicals, and said organo radicals of (C) are members selected from the class consisting of R' radicals defined above, and cyanoalkyl radicals.

Radicals included by R and R' above, are for example, monovalent aryl radicals, halogenated monovalent aryl radicals, such as phenyl, xylyl, chlorophenyl, naphthyl; aralkyl radicals such as benzyl, phenylethyl; aliphatic, and cycloaliphatic radicals such as alkyl, alkenyl, cycloalkyl, chloroalkyl; such as methyl, ethyl, propyl, chloropropyl, vinyl, allyl, trifluoropropyl, cyclohexyl, etc. Radicals included by R'' are all of the aforementioned R and R' radicals, as well as cyanoethyl, cyanopropyl, cyanobutyl, etc. Where R, R', R'' can represent more than one radical, these radicals can be the same or any two or more of the aforementioned R, R' and R'' radicals respectively.

As utilized hereinafter, the expression "nitrogen-containing silicon material" indicates a material having the structural unit of Formula 1, and more than one chemically combined —OY radical attached to silicon, where the term "silicon" indicates the same silicon atom of the structural unit or a different silicon atom. In addition, it also indicates a mixture of material having the structural unit of Formula 1, in which some of the materials preferably less than 10 mole percent of the mixture, have only one —OY radical attached to silicon, and preferably at least 90 mole percent of the mixture consists of nitrogen-containing silicon material having two or more —OY radicals, such as up to six —OY radicals attached to silicon. Included by the nitrogen-containing silicon materials of the invention having a structural unit of Formula 1 are, (a) aminoxy silanes of the formula, (4) $\quad (R')_a(A)_b Si[OY]_{4-(a+b)}$ (b) aminoxy cyclopolysiloxanes composed of from 3 to 8 chemically combined siloxy units consisting of at least two aminoxy siloxy units of the formula, (5)
$$\begin{array}{c} R' \\ YOSiO \end{array}$$

with up to 7 diorganosiloxy units of Formula 2, (c) aminoxy polysiloxanes composed of at least two units of Formula 5 chemically combined with from 1 to 18 units of Formula 2, and chain-stopped with units of the formula, (6) $\quad (R'')_3 SiO$ (d) aminoxysilicon material of the formula, (7)
$$R'_c Si\left[\left(\begin{array}{c} R'' \\ OSi \\ R'' \end{array}\right)_d OY\right]_{4-c}$$

and aminoxy-substituted silicon materials of the formula, (8)
$$Z \!\!-\!\!\left[\begin{array}{c} R'' \\ | \\ SiOY \\ | \\ R'' \end{array}\right]_2$$

where R', R'' and Y are as defined above, A is selected from hydrogen, alkoxy, and units of Formula 6, Z is a radical selected from oxygen, $$R''' \text{ and } \!-\!\!\left[\begin{array}{c} R'' \\ | \\ R'''Si \\ | \\ R'' \end{array}\right]_d\!\! R'''$$

where R''' is a divalent hydrocarbon radical including methylene, polymethylene, phenylene, naphthylene, etc., $a$ is a whole number equal to 0 to 2, inclusive, $b$ is a whole number equal to 0 to 2, inclusive, the sum of $a$ and $b$ is equal to 0 to 2, inclusive, $c$ is a whole number equal to 0 to 2, inclusive, and $d$ is an integer equal to 1 to 18, inclusive.

Silicon hydrides which can be employed in the foam compositions of the present invention, preferably have chemically combined siloxy units having hydrogen attached to silicon, such as $R''_2 HSiO_{0.5}$, $R''_1 H_2 SiO_{0.5}$, $R'' HSiO$, $H_2 SiO_{1.5}$, etc. In addition, silanes of Formula 4 where A is hydrogen are included, as well as silanes of the formula, (9) $\quad (G)_e SiH_{4-e}$ where G is an alkyl radical having from 4 to 18 carbon atoms, and $e$ is an integer equal to 1 or 2. For example, amylsilane, octylsilane, dodecylsilane, etc.

The silicon hydride is preferably a siloxane hydride, which has at least 10 mole percent of hydrogen-containing siloxy units based on the total number of chemically combined siloxy units. The siloxane hydride can be in the form of a homopolymer or copolymer of such hydrogen-containing siloxy units with organosiloxy units of Formulae 2 and 6. The siloxane hydrides also can be in the form of cyclic polysiloxane homopolymer or copolymer composed of chemically combined $(H)_f(R'')_g SiO$ units, where $f$ can be 1 or 2, and $g$ can be 0 or 1, and units of Formula 2. Specific examples of copolymeric linear or cyclic siloxanes having hydrogen attached to silicon are for example, a copolymer containing 15 mole percent chemically combined R''HSiO units, such as methyl hydrogen siloxy units, and 85 mole percent of chemically combined dimethylsiloxy units; a copolymer containing 50 mole percent of dimethylsiloxy units, and $H_2 SiO$ units, etc. In particular situations, the siloxane hydride can contain hydroxy radicals attached to silicon in addition to monovalent hydrocarbon radicals attached to silicon as previously indicated.

The hydroxylated materials that can be utilized in the practice of the invention include hydroxy-containing organic or inorganic compounds. The preferred hydroxylated material is water. In addition, there is included silanols, such as diphenylsilanediol, low molecular weight hydroxylated siloxane, for example, tetramethylsiloxanediol, etc., having up to 25% by weight of chemically combined hydroxy based on the weight of total siloxane; monohydric and polyhydric organic alcohols having up to 8 carbon atoms, such as ethanol, isopropanol, butanol, glycerol, ethylene glycol, propylene glycol, 1,6-hexanediol, etc., hydroxylamines such as $HONR_2$; carboxylic acids having less than 12 carbon atoms such as formic, acetic, isobutyric, benzoic, succinic, etc.

Linear organosilicon polymers consisting essentially of units of Formula 2, which can be utilized in the practice of the invention and terminated with silanol units included by Formula 3, etc. can be made by effecting the polymerization of cyclic diorganosiloxane consisting of chemically combined units of Formula 2, for example, octamethylcyclotetrasiloxane, octaphenylcyclotetrasiloxane, etc., by heating such cyclics with a siloxane rearrangement catalyst such as potassium hydroxide, tetrabutylphopshonate, etc. at a temperature in the range of between 125° C. to 150° C. There can be added to the resulting high molecular weight polymer, for example, polydimethylsiloxane, increments of water until a product is produced having a viscosity of at least 1,000 centipoises at 25° C. Preferably, a viscosity of between about 2,500 centipoises to 150,000 centipoises at 25° C. can be employed. However, a viscosity of up to about 400,000 centipoises at 25° C. will provide for effective results.

Linear organosilicon polymer having terminal units of Formula 3 where X is hydrogen, can be made by equilibration procedures utilizing cyclic diorganopolysiloxanes such as octamethylcyclotetrasiloxane and organopolysiloxane and low molecular weight organopolysiloxane having terminal units of Formula 3, where X is hydrogen. For example, 1,3-dihydrotetramethyldisiloxane, 1,5-dihydrohexamethyltrisiloxane, etc. The employment of such linear organosilicon polymer in the practice of the invention having terminal siloxy units with hydrogen attached to silicon is limited to instances where such material is utilized in combination with the silanol-terminated linear organosilicon polymer in amounts previously described. When utilizing such organosilicon linear polymer having terminal units of Formula 3, where X is hydrogen, such units can be present in the linear polymer at up to about 1 mole percent of the total number of chemically combined siloxy units. Viscosities as high as 400,000 centipoises at 25° C. can be employed, and preferably in the range of between 1,000 to 150,000 centipoises at 25° C.

Included by the nitrogen-containing silicon materials of Formulae 4 and 7, as well as containing chemically combined units of 5 and 6 are the following, $$CH_3(CH_2)_4\!\!-\!\!\overset{H}{Si}[ON(C_6H_5)_2]_2, \ Si[ON(CH_2CH_3)_2]_4$$
$$[CH_3CH_2O]_3 SiON(C_4H_9)_2, \ Si[OSiON(CH_2CH_3)_2]_4$$
$$(CH_3)_3 SiO\!\!-\!\!Si[ON(CH_2CH_3)_2]_3, \ ClC_6H_4Si[ON(CH_3)(CH_2CH_3)]_3$$

aminoxypolysiloxanes, such as, $$\left[\begin{array}{c} CH_3 \\ | \\ -SiO- \\ | \\ (CH_2)_5CH_3 \end{array}\right]\left[\begin{array}{c} CH_3 \\ | \\ -SiO- \\ | \\ ON(CH_2CH_3)_2 \end{array}\right]_3$$

$$\left[\begin{array}{c} CH_3 \\ | \\ -SiO- \\ | \\ ON(CH_2CH_3)_2 \end{array}\right]_{4'}$$

$$(CH_3)_3 SiO\!\!-\!\!\left[\begin{array}{c} CH_3 \\ | \\ -SiO- \\ | \\ ON(CH_2CH_3)_2 \end{array}\right]_2\!\!-\!\!Si(CH_3)_3$$

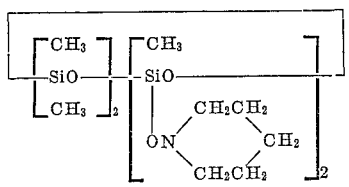

In addition, organosilicon materials included by Formula 8 are shown by the following,

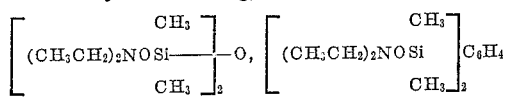

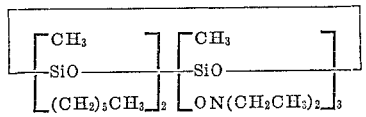

In addition to the aforementioned materials that are utilized in the foam-forming organopolysiloxane compositions of the present invention there also can be utilized fillers such as ferric oxide, fumed silica, diatomaceous earth, calcium carbonate, etc. In addition, copolymers of organopolysiloxanes, and polyethers in proportions of up to 10% by weight, based on the weight of the linear organosilicon polymer can be employed. A proportion of from 10 parts to 300 parts of filler based on the weight of the organopolysiloxane mixture also can be utilized. As utilized in the description of the present invention, the density of foam can be at least 5 lbs. per cubic foot, and higher.

As shown in Patent 3,296,199—Murphy and my copending application Ser. No. 423,354, filed concurrently herewith, and assigned to the same assignee as the present invention, the nitrogen-containing silicon materials having the structural unit included by Formula 1 readily react upon contact with hydroxy-containing organosilicon materials, such as the linear organosilicon polymer of the present invention having terminal units, shown by Formula 3, where X is hydroxy, forming a siloxane linkage and hydroxylamine, as shown by the following equation.

(10)  $SiOH + YOSi \equiv \rightarrow SiOSi + YOH$

It has been found that the employment of nitrogen-containing silicon materials having more than one chemically combined —OY radical attached to silicon in amounts sufficient to provide for an excess of —OY radicals to silanol, will provide for a reaction product of the nitrogen-containing silicon material and linear organosilicon polymer which will have terminal —OY radicals. Mixtures of nitrogen-containing silicon materials also can be employed, such as chain-stopping units having one —OY radical attached to silicon, coupling units, containing two —OY radicals attached to silicon, and nitrogen-containing silicon materials having more than two —OY radicals. However, the amount of the aforesaid chain-stopping nitrogen-containing silicon materials having one —OY radical attached to silicon utilized in such mixtures should not exceed an amount which will provide for a total of such chain-stopping units equal to or greater than the available silanol radicals of the linear organosilicon polymer.

Experimental evidence also indicates that the unexpected results achieved in accordance with the practice of the present invention relating to the liberation of hydrogen and production of organopolysiloxane foam are due in part to the formation of hydrogen gas resulting from the contact between the siloxane hydride, and the hydroxylated material in the presence of either the nitrogen-silicon material or the hydroxyl amine during the reaction.

In the practice of the method of the present invention, the order of addition of the various components utilized in making organopolysiloxane foam is not critical. For example, organopolysiloxane foam can be made by mixing together the nitrogen-containing silicon material, referred to hereinafter as the "nitrogen-silicon material," the linear organosilicon polymer consisting essentially of units of Formula 2 and chain-stopped with units of Formula 3, referred to hereinafter as the "linear polymer" and the silicon hydride having hydrogen attached to silicon, referred to hereinafter as the "siloxane hydride," and the hydroxylated material.

In particular situations, however, when the above described ingredients are mixed together, it has been found that by varying the order of addition of the various components in the foam-forming mixture, various mixtures can be produced having different pot lives, cure times, etc. Experience has shown for example, that if a foam-forming organopolysiloxane mixture is desired having a pot life of several hours or more, it is preferred to mix the nitrogen-silicon material and the linear polymer and optionally with the siloxane hydride, in the absence of the hydroxylated material. In addition, the amount of the nitrogen-silicon material utilized in foam-forming compositions having an extended pot life should be sufficient to completely react with all of the available silanol radicals of the linear polymer; the mixture prior to the addition of the hydroxylated material will contain linear polymer having terminal —OY radicals. An amount of nitrogen-silicon material can be utilized which is sufficient to provide for moles of —OY radicals substantially equal to, or greater than the moles of silanol radicals of the linear polymer. A ratio of up to 25 —OY radicals to 1 of silanol, can be employed. Higher amounts of nitrogen-silicon material can be employed however, if desired, being only limited by economic considerations. Alternatively, if it is desired to produce an organopolysiloxane foam-forming mixture having a relatively shorter pot life, an amount of the nitrogen-silicon material can be utilized which is insufficient to provide for a concentration of —OY radicals equal to the available silanol radicals of the mixture.

In instances where the hydroxylated material as previously defined is utilized in the form of a liquid, such as water, a hydroxylamine, aliphatic alcohol such as methanol, ethanol, etc.; it can be added directly to the other ingredients of the mixture while the mixture is stirred. The practice of the method of the invention utilizing such procedure provides for immediate foaming which may be desirable in particular situations.

The method of the present invention is operable at temperatures between 0° C. to as high as 100° C. or up to the boiling point of the nitrogen-silicon material employed. Although the organopolysiloxane foam can be produced under atmospheric conditions, the employment of an environment utilizing pressures below atmospheric are also operable.

In the absence of the hydroxylated material, it has been found that in particular situations, the mixture of the nitrogen-silicon material, the linear polymer, and the siloxane hydride, can be stored or packaged for an extended period of time, such as 6 months or more, without the production of substantial amounts of hydrogen. In instances where such a mixture is desired for the purpose of practicing the method of the invention, contact with the hydroxylated material, such as by exposure to air will provide for effective results.

In producing the foamable composition of the present invention, it has been found expedient to minimize the introduction of moisture during the mixing of the various components, as well as during its shelf period. If the ingredients utilized in making the foamable composition are sufficiently dried so that the resulting mixture has no more than 100 parts of water, per million parts of foamable composition, optimum foaming results can be achieved.

In order that those skilled in the art will be better able to practice the invention, the following examples are given

Example 1

A silanol-terminated dimethylpolysiloxane having a viscosity of 90,000 centipoises at 25° C. was mixed under substantially anhydrous conditions with a silicon-nitrogen material having the formula

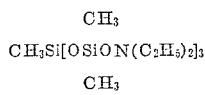

and 10% by weight of the above-described, silanol-terminated dimethylpolysiloxane of a siloxane hydride having a viscosity of about 20 centipoises at 25° C., and consisting essentially of chemically combined methyl hydrogen siloxy units and terminated with trimethylsiloxy units. The ratio of the N,N-diethylaminoxy radicals (—OY) to silanol radicals in the resulting mixture was about 8.5 to 1. The mixture was allowed to contact the atmosphere while it was stirred. A cured foam was obtained after 6 to 8 hours having a tensile of 20 p.s.i.

Example 2

A substantially anhydrous mixture of a silanol-terminated polydimethylsiloxane having a viscosity of 2,800 centipoises at 25° C., and a nitrogen-silicon material having the formula, $$Si[OSi(CH_3)_5ON(C_2H_5)_2]_4$$

which had an excess of N,N-diethylaminoxy radicals over silanol radicals, was heated to 70° C. with stirring for two hours. Volatile products such as N,N-diethylhydroxylamine were removed under vacuum. The same amount of the siloxane hydride of Example 1, dried over phosphorous pentoxide, was added to the mixture with stirring. The mixture was allowed to cool to room temperature and stored in a sealed container.

The above mixture remains unchanged for six months at 25° C. It is poured onto a megohm resistor. A cured foam is formed after several hours encapsulating the resistor.

Example 3

A mixture of silanol-terminated polydimethylsiloxane having a viscosity of about 20,000 centipoises at 25° C., fumed silica, a siloxane hydride having a viscosity of 100 centipoises at 25° C., and consisting essentially of chemically combined methyl hydrogen siloxy units, and a silicon-nitrogen cyclic tetramer having the formula

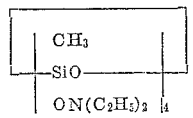

is stirred under atmospheric conditions at 25° C. Based on the weight of the silanol-terminated polydimethylsiloxane, the mixture contains 20% by weight of fumed silica, and 10% by weight of siloxane hydride. The mixture also has a ratio of about 9 N,N-diethylaminoxy radicals per silanol radical. A cured foam is obtained in 8 hours.

Example 4

There were mixed together, a silanol-terminated polydimethylsiloxane having a viscosity of about 20,000 centipoises at 25° C., 10% by weight thereof of a siloxane hydride having a viscosity of about 100 centipoises at 25° C., and consisting esentially of chemically combined methyl hydrogen siloxy units and terminated with trimethylsiloxy units, and the silicon-nitrogen cyclic tetramer of Example 3. The mixture contained about 25 mole percent of N,N-diethylaminoxy radicals attached to silicon, based on the total moles in the mixture of these radicals and silanol radicals attached to silicon. The mixture was exposed to the atmosphere; it formed a high density foam after about 1½ hours.

Example 5

There were mixed together the silanol-terminated polydimethylsiloxane of Example 4, a polydimethylsiloxane having a viscosity of about 20,000 centipoises at 25° C., terminated with dimethylsiloxy units having hydrogen attached to silicon, 10% by weight of the mixture of the siloxane hydride utilized in Example 4, consisting essentially of chemically combined methyl hydrogen siloxy units, and the silicon-nitrogen cyclic tetramer of Example 3. The resulting mixture contained about 25 mole percent of N,N-diethylaminoxy radicals, 37½ mole percent of hydrogen attached to silicon of the polydimethylsiloxane terminated with dimethyl hydrogen siloxy units, and 37½ mole percent of silanol radicals of the polydimethylsiloxane terminated with dimethylsilanol units, based on the total moles in the mixture of the silanol radicals, the hydrogen radicals attached to silicon of the polydimethylsiloxane terminated with dimethyl hydrogen siloxy units, and the N,N-diethylaminoxy radicals. The mixture was exposed to the atmosphere at 25° C. for about 1½ hours; a cured high density foam was produced.

Example 6

The process of Example 3 was repeated, except that diphenyldi-(N,N-diethylaminoxy)silane was employed as the nitrogen-silicon material.

The mixture began to foam upon exposure to air at 25° C. It had a work life of approximately one hour; a tack-free foam was produced after four hours.

Example 7

The procedure of Example 3 was repeated, except a nitrogen-silicon material was employed having the formula,

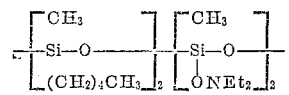

The resulting mixture had a ratio of about 4 N,N-diethylaminoxy radicals per silanol radical. The composition was exposed to the air; it had a pot life of about 4 hours. It cured up to a tack-free foam after about 48 hours.

While the foregoing examples have been limited to only a few of the very many nitrogen-silicon materials that are operable in the present invention, as well as the various linear organosilicon polymers, in combination with the various siloxane hydrides, it should be understood that the present invention is directed to a much broader class of compositions that can be made by mixing any one of the nitrogen-silicon materials shown in Formulae 4, 7, and 8, as well as consisting of units of 5 and 6, in combination with linear organosilicon polymers consisting essentially of units of 2 and 3, etc. The method of the present invention also can include a number of variables such as temperatures and the like, and employment of various hydroxylated materials, which also are not shown in the above examples.

What I claim as new and desire to secure by Letters Patent of the United States is:

1. A method for making organopolysiloxane foam which comprises mixing together (A) a nitrogen-containing silicon material having the structural unit of the formula, $$\equiv SiOY$$

(B) a linear organosilicon polymer having a viscosity of at least 1,000 centipoises at 25° C., consisting essentially of chemically combined units of the formula, $$\overset{R''}{\underset{R''}{SiO}}$$

and terminal units of the formula,

R''
SiX
R'' where X is a member selected from the class consisting of a hydroxy radical and a mixture of hydrogen and hydroxy radicals, where the hydrogen can be present at up to 50 mole per cent based on the moles of hydrogen and hydroxy radicals, (C) a silicon hydride having a ratio of at least one organo radical per silicon atom, and (D) a hydroxylated material selected from the class consisting of water, silanol, low molecular weight hydroxylated siloxane, monohydric and polyhydric organic alcohols having up to 8 carbon atoms, hydroxyl amines, and carboxylic acids having less than 12 carbon atoms, where (A) is utilized in an amount sufficient to provide for a concentration of —OY radicals of said nitrogen-containing silicon material, of at least 25 mole percent of the total —OY radicals and X radicals in the resulting mixture, (C) is utilized in a proportion of from 1% to 75% by weight of (B), (D) is utilized in a proportion of up to 50% by weight of (B), (B) has a ratio of from 1.95 to about 2 R'' radicals per silicon atom, where said R'' radicals, and said organo radicals of (C) are members selected from the class consisting of R radicals, halogenated R radicals, and cyanoalkyl radicals, R is a monovalent hydrocarbon radical, Y is a monovalent amine radical selected from —NR$_2$ and a heterocyclic amine selected from the class consisting of piperidino, morpholino and pyrrolidino, joined to silicon by an Si ON linkage, and where the remaining valences of the silicon atom of said structural unit of (A), are satisfied by a member selected from the class consisting of —OY radicals, oxygen, R radicals, halogenated R radicals, divalent hydrocarbon radicals, and mixtures thereof.

2. The method of claim 1, where said nitrogen-containing silicon material is utilized in an amount sufficient to provide for moles of —OY radicals, substantially equal to the moles of X radicals of said linear organosilicon polymer of (B), based on the total —OY radicals, and X radicals in the resulting mixture.

3. The method of claim 1, where said nitrogen-containing silicon material is utilized in said mixture in an amount sufficient to provide for a mixture having a ratio of —OY radicals to silanol radicals of said linear organosilicon polymer, having a value greater than 1.

4. A composition comprising (A), a nitrogen-containing silicon material having the structural unit of the formula, ≡SiOY (B) a linear organosilicon polymer having a viscosity of at least 1,000 centipoises at 25° C. consisting essentially of chemically combined units of the formula, R''
SiO
R'' and terminal units of the formula,

R''
SiX
R'' where X is a member selected from the class consisting of hydroxy radicals, and a mixture of hydrogen and hydroxy radicals, where the hydrogen can be present at up to 50 mole percent based on the moles of hydrogen and hydroxy, (C) a silicon hydride having a ratio of at least one organo radical per silicon atom, where (A) is utilized in an amount sufficient to provide for a concentration in the resulting mixture of —OY radicals of (A), which is substantially equal to the concentration of X radicals of (B), (C) is utilized in a proportion of from 1% to 75% by weight of (B), where (B) has a ratio of from 1.95 to about 2 R'' radicals per silicon atom, where said R'' radicals of (C) are selected from the class consisting of R radicals, halogenated R radicals, and cyanoalkyl radicals, R is a monovalent hydrocarbon radical, Y is a monovalent amine radical selected from the class consisting of —NR$_2$ and a heterocyclic amine selected from the class consisting of piperidino, morpholino, and pyrrolidino, attached to silicon by a Si ON linkage, and where the remaining valences of the silicon atom of the structural unit of (A) are satisfied by a member selected from the class consisting of —OY radicals, oxygen, R radicals, halogenated R radicals, divalent hydrocarbon radicals, and mixtures thereof.

5. A composition comprising a mixture of (A) a nitrogen-containing silicon material having the structural unit of the formula, ≡SiOY (B) a linear organosilicon polymer having a viscosity of at least 1,000 centipoises at 25° C. consisting essentially of chemically combined units of the formula, R''
SiO
R'' and terminal units of the formula,

R''
SiX
R'' where X is a member selected from hydroxy, and a mixture of hydrogen and hydroxy, where the hydrogen can be present at up to 50 mole percent, based on the moles of hydrogen and hydroxy, (C) a siloxane hydride having at least one chemically combined siloxy unit with hydrogen attached to silicon in a ratio of at least one organo radical per silicon atom, where (A) is utilized in an amount sufficient to provide for a concentration in said mixture of —OY radicals greater than the concentration of X radicals, (C) is utilized in a proportion of from 1% to 75% by weight of (B), (B) has a ratio of from 1.95 to about 2 R'' radicals per silicon atom, where said R'' radicals, and said organo radicals of (C) are members selected from the class consisting of R radicals, halogenated R radicals, and cyanoalkyl radicals, R is a monovalent hydrocarbon radical, Y is a monovalent amine radical selected from the class consisting of —NR$_2$ and heterocyclic amine selected from the class consisting of piperidino, morpholino, and pyrrolidino attached to silicon by a Si ON linkage, and where the remaining valences of said structural unit of (A) can be satisfied by a member selected from the class consisting of —OY, oxygen, R radicals, halogenated R radicals, divalent hydrocarbon radicals, and mixtures thereof.

6. A composition comprising a mixture of (A) a silicon-nitrogen material having the formula, CH$_3$
CH$_3$Si[OSiON(C$_2$H$_5$)$_2$]$_3$
CH$_3$ (B) a silanol-stopped polydimethylsiloxane having a viscosity of at least 1,000 centipoises at 25° C., (C) a siloxane hydride consisting essentially of chemically combined methyl hydrogen siloxy units, where (A) is utilized in said mixture in an amount sufficient to provide for a concentration of —ON(C$_2$H$_5$)$_2$ radicals greater than the concentration of silanol radicals, (C) is utilized in a proportion of from 1% to 75% by weight of (B).

7. A composition in accordance with claim 6 where the silicon-nitrogen material has the formula,

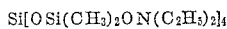
Si[O Si(CH₃)₂ON(C₂H₅)₂]₄

8. A composition in accordance with claim 6 where said silicon-nitrogen material has the formula,

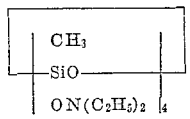

9. A composition in accordance with claim 6, where said siloxane hydride is utilized in said mixture at about 10% by weight of said silanol-stopped polydimethylsiloxane.

10. The method of claim 1, where the hydroxylated material is water.

11. The composition of claim 4 containing a filler.

12. The composition of claim 4, where the silicon hydride is utilized at about 10% by weight of the linear, organosilicon polymer.

13. A composition in accordance with claim 6, where the silicon-nitrogen material has the formula,

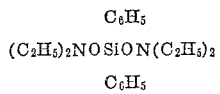

14. A composition in accordance with claim 6, where the silicon-nitrogen material has the formula,

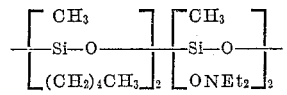

References Cited
UNITED STATES PATENTS

| | | | |
|---|---|---|---|
| 3,070,555 | 12/1962 | Bruner | 260—2.5 |
| 3,127,363 | 3/1964 | Mitzsche et al. | 260—2.5 |
| 3,133,110 | 5/1964 | Morehouse et al. | 260—448.2 |
| 3,280,072 | 10/1966 | Frankland | 260—46.5 |
| 3,296,199 | 1/1967 | Murphy | 260—46.5 |

MURRAY TILLMAN, *Primary Examiner.*

M. J. TULLY, *Assistant Examiner.*